Dec. 7, 1926.

O. L. STEENSLAND 1,609,892

TRANSMISSION BAND INSERTER

Filed May 20, 1926　　2 Sheets-Sheet 1

Inventor

Osmond L. Steensland

By Lynn N. Latta Attorney

Dec. 7, 1926.
O. L. STEENSLAND
1,609,892
TRANSMISSION BAND INSERTER
Filed May 20, 1926   2 Sheets-Sheet 2
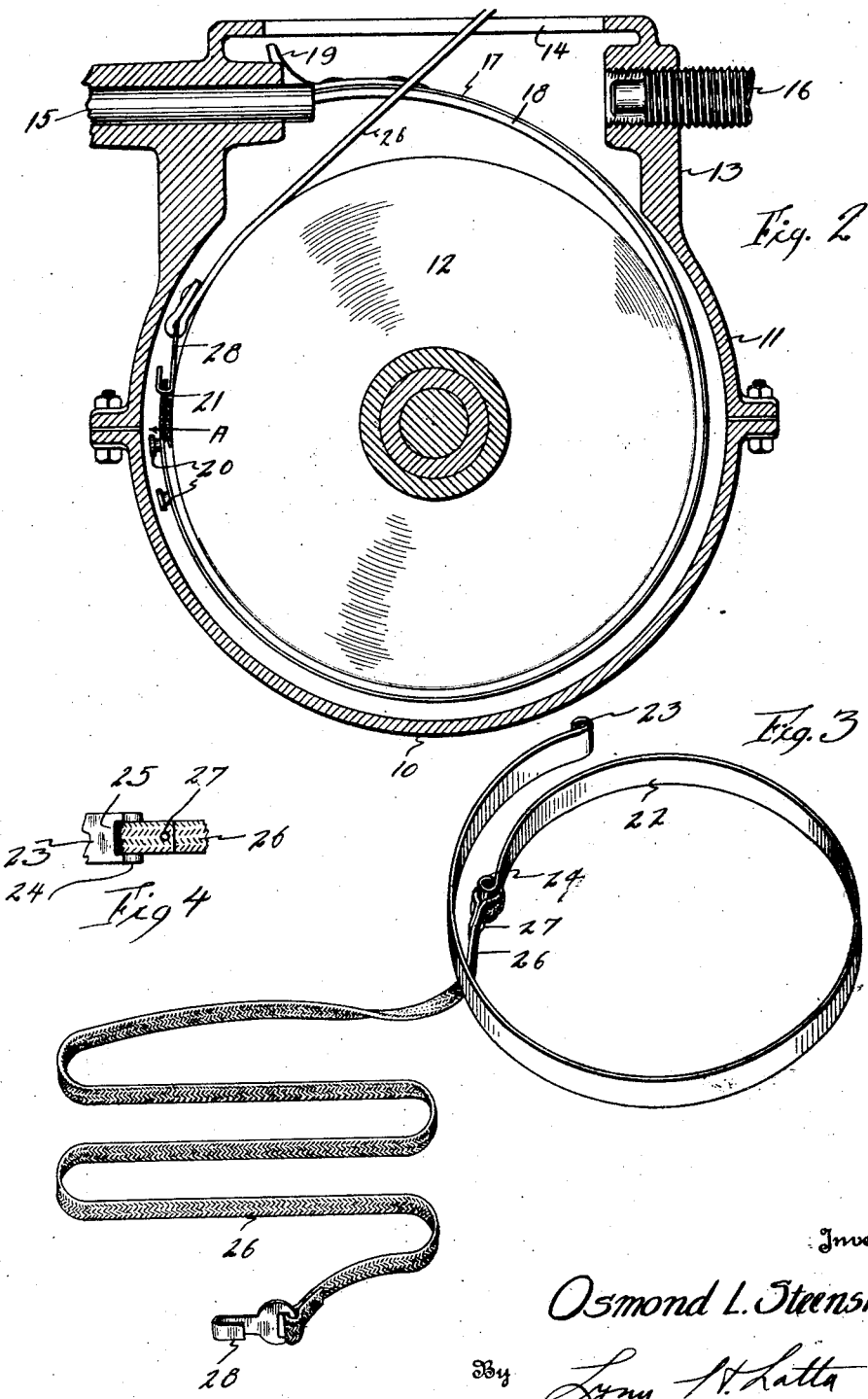
Inventor
Osmond L. Steensland
By Lynn H. Latta
Attorney Patented Dec. 7, 1926.

1,609,892

UNITED STATES PATENT OFFICE.

OSMOND L. STEENSLAND, OF LAKE ANDES, SOUTH DAKOTA.

TRANSMISSION-BAND INSERTER.

Application filed May 20, 1926. Serial No. 110,524.

My invention has to do with the replacement of Ford transmission bands which have been removed for relining, and the object of my invention is to provide a device to facilitate the replacing of the old style transmission bands with bands of the new style, having removable ears, without removing the hogshead or the upper portion of the transmission casing.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 2 is a similar sectional view illustrating the insertion of the transmission band itself.

Fig. 3 is a perspective view of the tool, and

Fig. 4 is a detail view illustrating the connection of the spring and cable of the tool.

Figure 1:
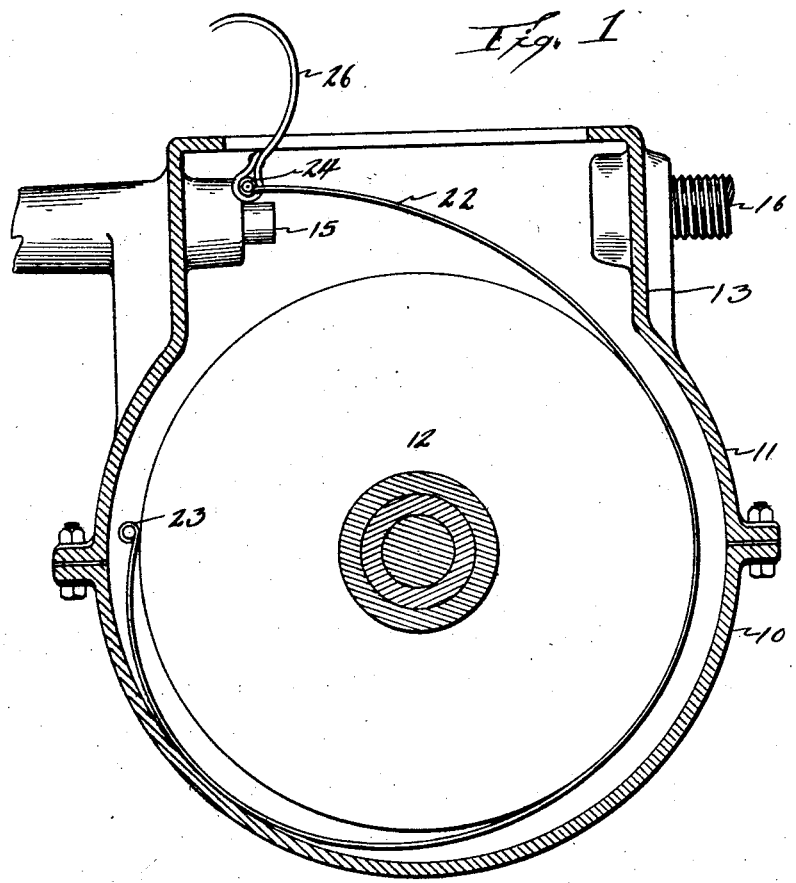
Fig. 1 is a sectional view through the transmission casing of a Ford automobile, showing in elevation the middle transmission drum, and illustrating the method of inserting my tool preparatory to inserting the transmission band.

In Fig. 2 I have shown a cross section through the type of transmission housing mentioned above, in which the lower half of the housing is shown at 10, and the upper half or hogshead at 11. The central transmission drum is indicated at 12. The hogshead, 11, has the box-shaped portion, 13, which is provided with an opening, 14, at its top to allow access to the transmission drums and bands.

The transmission bands, when inserted around the drum, 12, are provided with a pair of ears which extend upwardly between the clutch pedal shaft, 15, and the adjusting screw, 16.

Formerly it was necessary to remove the hogshead, 11, in order to allow removal of the bands for relining since the ears at the ends of the bands would not pass through the space between the hogshead and transmission drum.

In the present style of manufacture the transmission bands are constructed as shown in Fig. 2, in which 17 indicates the steel band, 18 the lining, and 19 the fixed ear. An ear similar to the ear, 19, is secured to the other end of the band by means of studs, 20, which are engaged in slots in the ear, (not illustrated). A slot, 21, in the end of the band is provided to facilitate removal of the ear from engagement with the band.

Although the bands and the transmission drums are of greater width than the old style, bands similar to the new style are provided for the old style automobiles and are inserted in practically the same manner, it being only necessary to shorten the shaft, 14, for this purpose. The old bands may be removed by severing one of the ears from the end of the band, and thus, as in the new style of automobile, the bands removed and replaced without removing the hogshead.

However, in replacing bands in the old make of car, and in some instances in replacing the bands in the new style vehicle, there is a tendency for the band to become lodged against the casing at substantially the point, A, indicated in Fig. 2. This is probably due to the studs, 20, catching against some projection on the casing, such as the joint between the hogshead and the lower casing member. The bands, being normally of somewhat larger diameter than the drums, it can readily be seen that this is likely to happen, since they will not fit snugly against the drums as they are pushed into place.

I have therefore devised a tool which utilizes the slot, 21, as a means of connecting to the band and with which the band may be inserted very quickly with no difficulty.

The tool is shown in Fig. 3, and comprises a thin, flat coil spring, 22, having a loop, 23, at one end and a loop, 24, at the other end, adjacent which is the slot, 25. Through the slot, 25, is threaded the end of a cable, 26, which is secured back upon itself, as at 27. The cable may be of stranded wire or stranded fabric, or a flat tape as shown, or it may be a chain or flexible wire having sufficient tensile strength to withstand the strain to which it is subjected.

At the free end of the cable, 26, is secured a hook, 28, which, in the present drawing, is shown as being made of a flat piece of metal and having a hooked end sufficiently wide to enter the slot, 21.

The coil spring, 22, has a normal diameter somewhat less than that of the transmission drum and has a circumference substantially the same. Consequently in its normal position the ends of the coil spring will overlap, as shown in Fig. 3.

In using the tool the free end of the coil spring is inserted between the drum and the hogshead, as shown in Fig. 1, and by a slight pressure the spring may be caused to slip around the drum, as illustrated. Due to the curvature of the spring, the end thereof will constantly engage the drum, as indicated in Fig. 1 and thus there will be no possibility of its becoming engaged against an obstruction on the inner surface of the transmission casing. The rounded loop, 23, further aids in preventing any possibility of the spring being caught.

The spring may be pushed to a position where the free end thereof may be grasped by the hand and pulled on around until only the cable remains in the transmission casing.

It might appear that the cable might be dispensed with and simply a spring of greater length than illustrated used in its place. I have found, however, that the pressure to which the spring will be subjected in pulling the transmission band into place will so stretch it from its natural position, and so straighten it that it will no longer satisfactorily transverse the space between the drum and the hogshead as readily as it should. Where the cable is used I find that the ordinary mechanic will not grasp the spring in order to pull upon the cable, but will take hold of the cable itself and pull the transmission band through.

Furthermore, I find that a perfectly tractable cable as illustrated will at all times keep the end of the transmission band to which it is attached, pulled tight against the drum, so as to prevent the band catching against the casing. (See Fig. 2.)

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A transmission band inserter for an automobile having a transmission drum, comprising a coil spring of normal curvature less than the curvature of said drum, and a tractable cable secured to one end of said spring, the other end of said cable being provided with means to engage a slot in the end of a transmission band.

2. A transmission band inserter for an automobile having a transmission drum, comprising a coil spring, and a tractable cable secured to one end of said spring, the other end of said cable being provided with means to engage a slot in the end of a transmission band.

Signed at Lake Andes, in the county of Charles Mix and State of South Dakota this 13th day of May, 1926.

OSMOND L. STEENSLAND.